(12) United States Patent
Suciu et al.

(10) Patent No.: US 7,448,221 B2
(45) Date of Patent: Nov. 11, 2008

(54) TURBINE ENGINE ROTOR STACK

(75) Inventors: Gabriel L. Suciu, Glastonbury, CT (US); James W. Norris, Lebanon, CT (US)

(73) Assignee: United Technologies Corporation, Hartford, CT (US)

( * ) Notice: Subject to any disclaimer, the term of this patent is extended or adjusted under 35 U.S.C. 154(b) by 524 days.

(21) Appl. No.: 11/016,454

(22) Filed: Dec. 17, 2004

(65) Prior Publication Data

US 2006/0130488 A1 Jun. 22, 2006

(51) Int. Cl.
*F02C 3/04* (2006.01)

(52) U.S. Cl. .................. 60/805; 415/141; 416/194

(58) Field of Classification Search .............. 415/141, 415/174.2, 174.4; 416/52, 194, 195, 196 R; 60/805
See application file for complete search history.

(56) References Cited

U.S. PATENT DOCUMENTS

| | | | | |
|---|---|---|---|---|
| 2,470,780 A * | 5/1949 | Ledwith | ............... | 415/110 |
| 3,094,309 A * | 6/1963 | Hull, Jr. et al. | ............... | 416/201 R |
| 3,295,825 A * | 1/1967 | Hall, Jr. | ............... | 416/221 |
| 3,916,495 A * | 11/1975 | Klassen et al. | ............... | 29/888.011 |
| 4,088,422 A * | 5/1978 | Martin | ............... | 416/198 A |
| 4,645,416 A | 2/1987 | Weiner | | |
| 4,719,747 A * | 1/1988 | Willkop et al. | ............... | 60/785 |
| 5,236,302 A * | 8/1993 | Weisgerber et al. | ............... | 415/173.7 |
| 5,267,397 A * | 12/1993 | Wilcox | ............... | 29/889.2 |
| 5,267,832 A * | 12/1993 | Johnson et al. | ............... | 415/115 |
| 5,288,210 A * | 2/1994 | Albrecht et al. | ............... | 416/198 A |
| 5,628,621 A | 5/1997 | Toborg | | |
| 5,632,600 A | 5/1997 | Hull | | |
| 6,082,967 A * | 7/2000 | Loisy | ............... | 416/129 |
| 6,089,827 A | 7/2000 | Ichiryu et al. | | |
| 6,267,553 B1 * | 7/2001 | Burge | ............... | 415/115 |
| 6,398,485 B1 * | 6/2002 | Frosini et al. | ............... | 415/115 |
| 6,464,453 B2 * | 10/2002 | Toborg et al. | ............... | 415/115 |
| 6,672,966 B2 | 1/2004 | Muju et al. | | |
| 7,186,079 B2 * | 3/2007 | Suciu et al. | ............... | 415/199.5 |
| 7,234,918 B2 * | 6/2007 | Brillert et al. | ............... | 415/173.5 |
| 7,309,210 B2 * | 12/2007 | Suciu et al. | ............... | 415/174.2 |
| 2004/0086378 A1 * | 5/2004 | Brisson et al. | ............... | 415/173.7 |

FOREIGN PATENT DOCUMENTS

JP 10252403 A 9/1998

* cited by examiner

*Primary Examiner*—William H Rodríguez
(74) *Attorney, Agent, or Firm*—Bachman & LaPointe, P.C.

(57) ABSTRACT

A turbine engine has a first disk and a second disk, each extending radially from an inner aperture to an outer periphery. A coupling, transmits a torque and a longitudinal compressive force between the first and second disks. The coupling has first means for transmitting a majority of the torque and second means, radially outboard of the first means, for transmitting a majority of the force.

23 Claims, 3 Drawing Sheets

TURBINE ENGINE ROTOR STACK

BACKGROUND OF THE INVENTION

The invention relates to gas turbine engines. More particularly, the invention relates to gas turbine engines having center-tie rotor stacks.

A gas turbine engine typically includes one or more rotor stacks associated with one or more sections of the engine. A rotor stack may include several longitudinally spaced apart blade-carrying disks of successive stages of the section. A stator structure may include circumferential stages of vanes longitudinally interspersed with the rotor disks. The rotor disks are secured to each other against relative rotation and the rotor stack is secured against rotation relative to other components on its common spool (e.g., the low and high speed/pressure spools of the engine).

Numerous systems have been used to tie rotor disks together. In an exemplary center-tie system, the disks are held longitudinally spaced from each other by sleeve-like spacers. The spacers may be unitarily-formed with one or both adjacent disks. However, some spacers are often separate from at least one of the adjacent pair of disks and may engage that disk via an interference fit and/or a keying arrangement. The interference fit or keying arrangement may require the maintenance of a longitudinal compressive force across the disk stack so as to maintain the engagement. The compressive force may be obtained by securing opposite ends of the stack to a central shaft passing within the stack. The stack may be mounted to the shaft with a longitudinal precompression force so that a tensile force of equal magnitude is transmitted through the portion of the shaft within the stack.

Alternate configurations involve the use of an array of circumferentially-spaced tie rods extending through web portions of the rotor disks to tie the disks together. In such systems, the associated spool may lack a shaft portion passing within the rotor. Rather, separate shaft segments may extend longitudinally outward from one or both ends of the rotor stack.

Desired improvements in efficiency and output have greatly driven developments in turbine engine configurations. Efficiency may include both performance efficiency and manufacturing efficiency.

U.S. patent application Ser. No. 10/825,255, Ser. No. 10/825,256, and Ser. No. 10/985,863 of Suciu and Norris (hereafter collectively the Suciu et al. applications, the disclosures of which are incorporated by reference herein as if set forth at length) disclose engines having one or more outwardly concave inter-disk spacers. With the rotor rotating, a centrifugal action may maintain longitudinal rotor compression and engagement between a spacer and at least one of the adjacent disks. This engagement may transmit longitudinal torque between the disks in addition to the compression.

SUMMARY OF THE INVENTION

One aspect of the invention involves a turbine engine having a first disk and a second disk, each extending radially from an inner aperture to an outer periphery. A coupling, transmits a torque and a longitudinal compressive force between the first and second disks. The coupling has first means for transmitting a majority of the torque and second means, radially outboard of the first means, for transmitting a majority of the force.

In various implementations, the second means may include spacers (e.g., as in the Suciu et al. applications or otherwise). The first means may comprise radial splines or interfitting first and second pluralities of teeth on the first and second disks, respectively. The first plurality of teeth may be formed at an aft rim of a first sleeve extending aft from and unitarily-formed with a web of the first disk. The second plurality of teeth may be formed at a forward rim of a second sleeve extending forward from and unitarily-formed with a web of the second disk. The first and second disks may each have an inboard annular protuberance inboard of the respective first and second sleeves. The second means may comprise a spacer having an outwardly longitudinally concave portion having a thickness and a longitudinal extent effective to provide an increase in said force with a rotation speed of the first and second disks. The engine may have a high speed and pressure compressor section and a low speed and pressure compressor section. The first and second disks may be in the high pressure compressor section. A plurality of circumferentially-spaced anti vortex tubes may be carried by the first means. A tension shaft may extend within the inner aperture of each of the first and second disks and be substantially nonrotating relative to the first and second disks. There may be means for sealing between the first disk and the shaft. A third disk may extend radially from an inner aperture to an outer periphery. A second coupling may transmit a torque and a longitudinal compressive force between the third and second disks. The second coupling may include first means for transmitting a majority of the torque and second means, radially outboard of the first means, for transmitting a majority of the force. There may be no off-center tie members holding the first and second disks under longitudinal compression.

Another aspect of the invention involves a thermally-controlled, center-tied, rotor. The rotor has a central shaft and a plurality of blade disks. The disks each have a central aperture surrounding the shaft. The disks define annular cavities between adjacent pairs of the disks. One or more circumferentially distributed anti-vortex tubes extend within at least a first of said cavities between a first and second of said disks. A radially compliant seal is between the shaft and at least one of said disks.

In various implementations, a radial spline torque coupling may be between the first and second disks and carry the one or more circumferentially distributed anti-vortex tubes. The radially compliant seal may be a metallic bellows seal positioned to thermally isolate at least a portion of or more of the cavities from one or more others of the cavities. The one or more circumferentially distributed anti-vortex tubes may be a plurality of evenly circumferentially-spaced tubes at a common longitudinal position.

Another aspect of the invention involves a turbine engine rotor having a plurality of disks and a plurality of stages of blades. Each disk extends radially from an inner aperture to an outer periphery. Each stage is borne by an associated one of said disks. There are a plurality of spacers, each spacer between an adjacent pair of said disks. A central shaft carries the plurality of disks and the plurality of spacers to rotate about an axis with the plurality of disks and the plurality of spacers. A first of the spacers transmits a longitudinal compressive force between a first and a second of the disks. Interfitting first and second portions of said first and second disks radially inboard of said first spacer transmit longitudinal torque between the first and second disks.

In various implementations, the interfitting first and second portions may comprise radial splines. The first spacer may be unitarily-formed with the first disk. The first spacer may have an end portion essentially interference fit within a portion of the second disk. The stator may comprise a plurality of stages of vanes. The first spacer may have a longitudinal cross-section, said longitudinal cross-section having a first portion being essentially outwardly concave in a static condition The stages of vanes may include at least a first stage of vanes having inboard vane tips in facing proximity to an outer surface of said first spacer at said first portion. The inboard tips of the first stage of vanes may be longitudinally convex.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
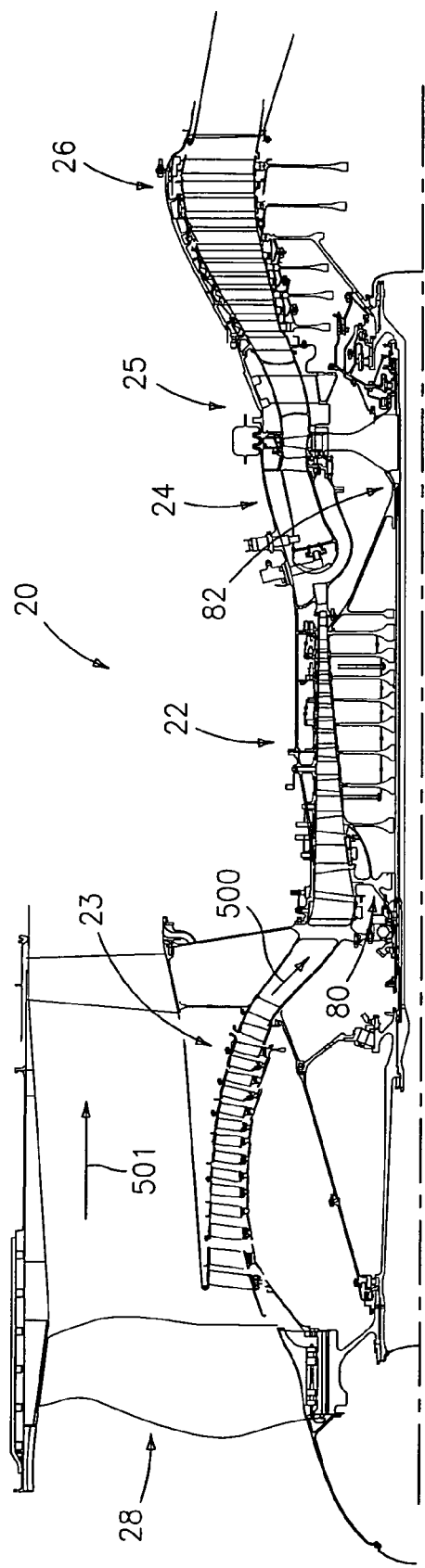
FIG. 1 is a partial longitudinal sectional view of a gas turbine engine.

FIG. 1 shows a gas turbine engine 20 having a high speed/pressure compressor (HPC) section 22 receiving air moving along a core flowpath 500 from a low speed/pressure compressor (LPC) section 23 and delivering the air to a combustor section 24. High and low speed/pressure turbine (HPT, LPT) sections 25 and 26 are downstream of the combustor along the core flowpath 500. The engine may further include a transmission-driven fan 28 driving air along a bypass flowpath 501 and/or an augmentor (not shown) among other systems or features.

Figure 2:
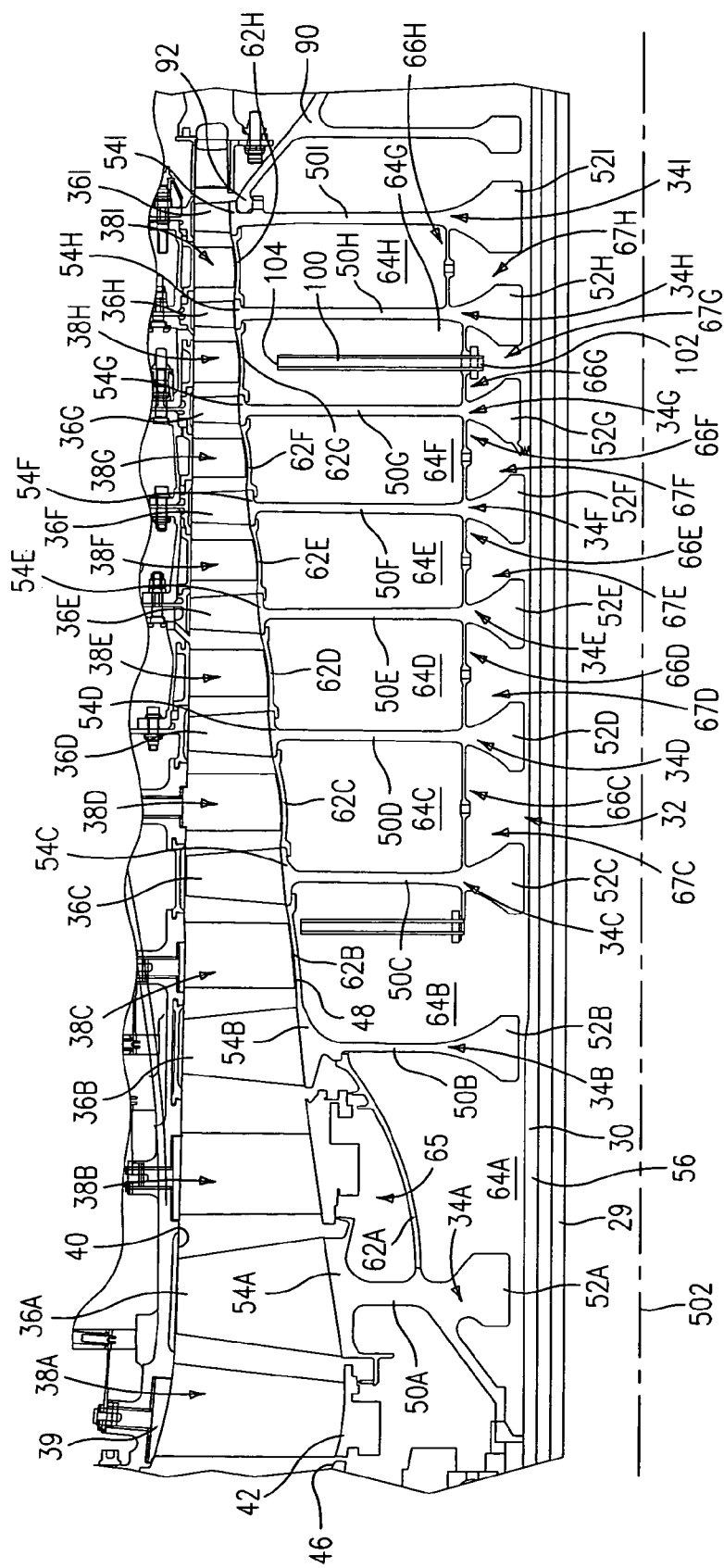
FIG. 2 is a partial longitudinal sectional view of a high pressure compressor rotor stack of the engine of FIG. 1.

The exemplary engine 20 includes low and high speed spools mounted for rotation about an engine central longitudinal axis or centerline 502 relative to an engine stationary structure via several bearing systems. The low speed spool includes a low speed shaft 29 (FIG. 2) carrying LPC and LPT rotors and their blades. The high speed spool includes the HPC and HPT rotors and their blades. FIG. 2 shows an HPC tie shaft 30 concentrically surrounding the low speed shaft 29. Each shaft 29 and 30 may be an assembly, either fully or partially integrated (e.g., via welding).

FIG. 2 shows an HPC rotor stack 32 mounted to the high speed shaft 30. The exemplary rotor stack 32 includes, from fore to aft and upstream to downstream, an exemplary nine blade disks 34A-34I each carrying an associated stage of blades 36A-36I. A plurality of stages of vanes 38A-38I are located along the core flowpath 500 sequentially interspersed with the blade stages. The vanes have airfoils extending radially inward from roots at outboard platforms 39 formed as portions of a core flowpath outer wall 40. The first (#1) and second (#2) vane stage airfoils extend inward to inboard platforms 42 forming portions of a core flowpath inboard wall 46. As is discussed in further detail below, the exemplary airfoils of the subsequent vane stages extend to inboard airfoil tips 48.

In the exemplary embodiment, each of the disks has a generally annular web 50A-50I extending radially outward from an inboard annular protuberance known as a "bore" 52A-52I to an outboard peripheral portion (blade platform bands) 54A-54I. The bores 52A-52I encircle central apertures of the disks through which a portion 56 of the tie shaft 30 freely passes with clearance. The blades may be unitarily formed with the peripheral portions 54A-54I (e.g., as a single piece with continuous microstructure), non-unitarily integrally formed (e.g., via welding so as to only be destructively removable), or non-destructively removably mounted to the peripheral portions via mounting features (e.g., via fir tree blade roots captured within complementary fir tree channels in the peripheral portions or via dovetail interaction, circumferential slot interaction, and the like).

A series of spacers 62A-62H connect adjacent pairs of the disks 34A-34I. In the exemplary engine, the first spacer 62A is formed integrally with (e.g., unitarily formed or welded to) the first disk web 50A and extends aft to a contacting engagement with the second disk. In the exemplary engine, the first spacer 62A is outwardly concave (e.g., as disclosed in the Suciu et al. applications) so that its contacting engagement with the second disk 34B produces a longitudinal engagement force increasing with speed due to centrifugal action tending to straighten/flatten the spacer section. In the exemplary engine, the second spacer 62B is formed integrally with the second disk (e.g., with the blade platform band 54B) and extends aft to a contacting engagement with the third disk 34C (e.g., at the blade platform band 54C). The remaining exemplary spacers 62C-62H are separately formed from their adjacent disks and in contacting engagement with the blade platform bands of the adjacent disks. The spacers 62B-62H have outboard surfaces in close facing proximity to the inboard tips of the associated vanes (e.g., as disclosed in the Suciu '863 application). Outward concavity of these spacers 62B-62H also provides the speed-increasing longitudinal compression force.

The first spacer 62A thus separates an inboard/interior annular inter-disk cavity 64A from an outboard/exterior annular inter-disk cavity 65. The cavity 65 may accommodate the platform 42 of the second vane stage 38B and the first spacer 62A may have features for sealing with that platform. As is discussed above, one or more of the remaining spacers (e.g., all the remaining spacers in the exemplary rotor stack), however, are shifted radially outward. The spacer upstream and downstream portions may substantially merge with or connect to the platform bands 54B-54G of the adjacent disks. Thus, the exemplary remaining spacers 62B-62H separate associated first annular inter-disk cavities 64B-64H from the core flowpath 500.

Figure 4:
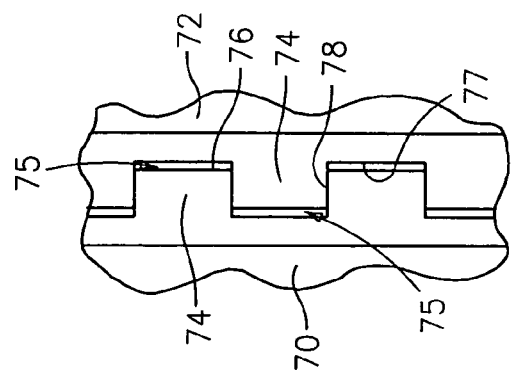
FIG. 4 is a radial view of interfitting splines of two disks of the stack of FIG. 2.

Additional inter-disk coupling is provided between at least some of the disks. FIG. 2 shows couplings 66C-66H radially inboard of the associated spacer 62C-62H. The couplings 66C-66H separate the associated first annular cavity 64C-64H from a second annular cavity 67C-67H. Each exemplary coupling 66C-66H includes a first tubular ring- or sleeve-like structure 70 (FIG. 3) extending aft from the disk thereahead and a second such structure 72 extending forward from the disk aft thereof. The exemplary structures 70 and 72 are each unitarily-formed with their associated individual disk, extending respectively aft and forward from near the junction of the disk web and bore. Alternative structures may be bonded or welded to or otherwise integrated or attached to remaining portions of the associated disk. At respective aft and fore rims of the structures 70 and 72, the structures include interfitting radial splines or teeth 74 in a circumferential array (FIG. 4). In the exemplary interfitting, each tooth 74 of one structure 70 or 72 is received in an inter-tooth space of the mating structure 72 or 70, respectively.

The exemplary illustrated teeth 74 have a longitudinal span roughly the same as a radial span and a circumferential span somewhat longer. As is discussed in further detail below, in the exemplary embodiment there may be a longitudinal gap 75 between each of the teeth 74 and their receiving inter-tooth space. In the exemplary embodiment, this gap 75 is between the longitudinal apex 76 of the tooth and the base 77 of the intertooth space. The sides 78 of each tooth 74 may extend longitudinally in sliding engagement with the adjacent side 78 of the adjacent interfitting tooth to permit relative longitudinal movement.

The couplings 66C-66H may provide a preferential transmission of torque rather than compression. Torque may be transmitted by the engagement of the tooth sides 78. The longitudinal gaps 75, if present, may permit the couplings 66C-66H to contract and essentially avoid transmission of compression forces.

In the exemplary rotor stack, at fore and aft ends 80 and 82 (FIG. 1), the rotor stack is mounted to the tie shaft 30 but intermediate (e.g., at the disk bores) is structurally clear of the shaft 30. At the aft end 82, a rear hub 90 (FIG. 2—which may be unitarily formed with or integrated with an adjacent portion of the tie shaft 30) extends radially outward and forward to an annular distal end 92 having an outboard surface and a forward rim surface. The outboard surface is captured against an inboard surface of an aft portion of the platform band 54I of the aft disk 34I. Engagement may be similar to the hub engagement of the Suciu et al. applications.

As with the spacers of the Suciu et al. applications, increases in speed may tend to radially expand the spacers 62A-62H, especially in intermediate longitudinal positions so as to partially flatten the spacers. Advantageously, the shapes of the tips 48 and spacer outboard surfaces are chosen to provide an essentially minimal gap at a specific steady state running condition and/or transient condition and/or range of such conditions.

Thus, the spacers 62A-62H locally take up the compressive load across the rotor stack. There may be an associated tensile load across the tie shaft 30 (subject to net longitudinal force applied to the blades by the airflow). However, at least between certain disks, additional couplings (e.g., 66C-66H) at least partially take up the inter-disk torsional (torque) load. For example, the spacers 62A and 62B may take up essentially all the compressive and torsional loads between the disks 34A-34C. Accordingly, the spacers 62A and 62B and their interfaces with the disks must have sufficient robustness to withstand such compressive and torsional loads. For example, there may be interfitting teeth or a particularly robust frictional/interference fit at the contact locations to transmit the torsional loads. However, the remaining spacers 62C-62H, may take up a smaller portion of the torsional load between the disks 34C-34I (e.g., less than half) and preferably essentially none (e.g., close to a deformation-limited minimum). The remainder of the torsional load may be taken up by the couplings 66C-66H.

In alternate embodiments, the couplings 66C-66H may take up some portion of the longitudinal load (e.g., if there are no gaps 75 or the gaps are small enough to become bottomed or if there is an additional load path). In such a case, the couplings 66C-66H may take up a similarly low fraction of the longitudinal load between the disks 34C-34I as the spacers 62C-62H take up of the torsional load. However, if the longitudinal load is so split, it may be difficult to predict and may present engineering problems.

The bifurcation of torque and compression coupling along at least a portion of the stack may provide design opportunities and advantages relative to configurations lacking such bifurcation (e.g., where all compression and torsion loads between an adjacent pair of disks are carried by a single spacer). By relieving the spacers 62C-62H of the need to carry torsional load, the spacers 62C-62H may be lightened relative to those of a baseline configuration. Particular lightening may be achieved at the contact locations with the associated disks (e.g., by removing tooth engagement features of particularly robust interference fitting portions). The complementary features of the disk bands 54C-54I may also be reduced or eliminated.

The additional couplings 66C-66H may represent the addition of more mass than is saved in lightening the spacers and disks. However, there may be one or more potential benefits. If a mass is located at the spacers or the platform bands, the relatively outboard location greatly increases the centrifugal stresses imposed by such mass. The radially inward shift of such mass (including possible net increase in mass) to the inboard structures may reduce the stresses. Reduced stresses may facilitate one or more of several design or redesign opportunities. The engine could be radially expanded. Because such expansion would increase stresses, the stress reduction afforded by the bifurcation allows overall stresses to remain sub-critical. At a given radial size, yet further lightening (e.g., of the disk bores and webs) may be permitted because the bores and webs are subjected to less loading. This potentially allows the achievement of engine sizes, geometries, and increased operating speeds otherwise unattainable or attainable only through much generally greater robustness (and mass) of components. Also even with an overall mass increase, it may be possible to reduce the rotor's polar moment of inertia, thereby improving acceleration/deceleration performance.

Various engineering considerations may influence which inter-disk couplings are bifurcated and which are not. In the exemplary engine, the core flowpath diverges radially outward in the downstream direction. Thus, centrifugal loading may be more significant in downstream regions. Thus, the exemplary upstream couplings are not bifurcated whereas downstream couplings are. A variety of engineering considerations influence the radial position profile of the core flowpath. This may, accordingly, influence the particular bifurcation adopted.

Figure 3:
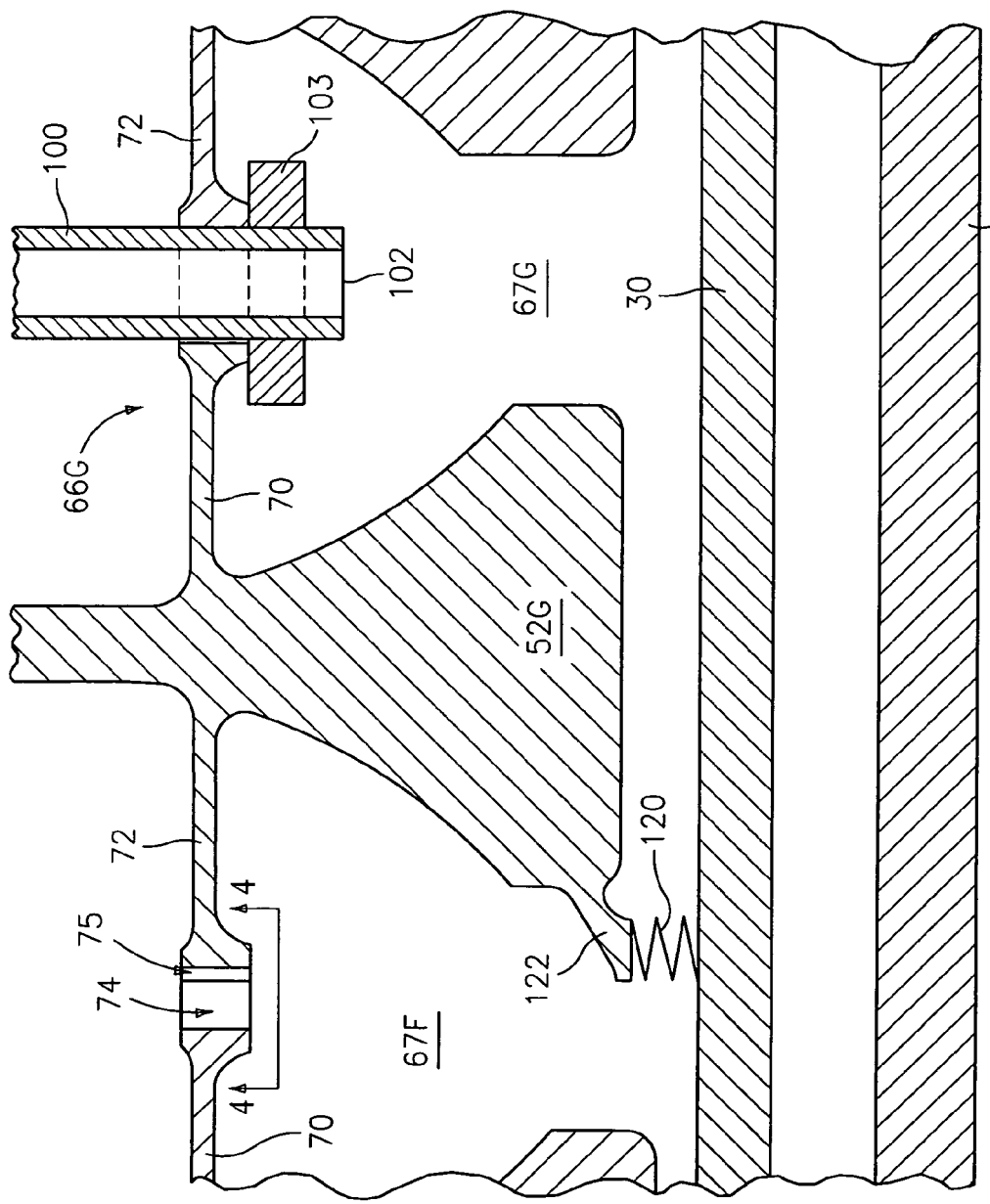
FIG. 3 is a longitudinal sectional view of a disk bore of the stack of FIG. 2.

Additionally, one or more of the couplings 66C-66H may be used to carry anti-vortex tubes 100 (FIG. 1). A variety of such tubes, otherwise mounted, are known in the art. In the exemplary engine, there are a circumferential array of tubes 100 (e.g., three to eight) at like longitudinal position, radially-extending, and evenly circumferentially-spaced, between the disks 34G and 34H. Near their inboard ends 102, the tubes 100 are mounted to the coupling 66G. For example, the tubes 100 may be mounted to a ring 103 (FIG. 3). The ring 103 may be snap fit to one of the structures (e.g., the structure 72). There may be a longitudinal gap between the tubes 100 and the other structure (e.g., 70) effective to provide similar compliance/freedom as do the gaps 75.

The tube outboard ends 104 are located at an outboard portion of the radial span between the centerline 502 and the flowpath 500. More particularly, they are well outboard (e.g., in an outboard half of the radial span between the coupling 66G and the spacer 62G). The tubes 100 direct a radially inward airflow to the space 67G. Advantageously, this airflow helps maintain a desired disk temperature profile to control thermal/mechanical stresses. Depending on conditions, the airflow may cool disk portions that are hotter than other portions or heat disk portions that are cooler than other portions.

It may be desirable to thermally isolate individual disks or groups of disks (e.g., to limit the particular disk(s) subject to thermal influence of flow through particular groups of tubes 100). For example, FIG. 3 shows a metallic bellows seal 120 extending inward from a narrow circumferential lip 122 at the forward end of the disk bore 52G. The seal 120 extends into contacting engagement with the outer surface of the tie shaft 30. Although the seal 120 may be secured to the shaft 30, advantageously there is circumferential freedom of movement to accommodate twist and circumferential oscillation. Similarly, the bellows cross-section provides a radial compliance to accommodate relative radial movement (e.g., vibration) of the shaft 30 relative to the bore 52G. The seal 120 isolates the annular volume 67F ahead of the disk bore 52G from the volume 67G therebehind.

As noted in the Suciu et al. '863 application, use of spacers such as 62B-62H may have additional advantages. The outward concavity provides radial recessing of the spacer outboard surface near the middle of the spacer. This recessing provides a greater radial span for the core flowpath. The increase in radial span provides an area rule effect, at least partially compensating for reduced flow cross-sectional area caused by the presence of the vane airfoils. This may improve compressor efficiency. The spacers 62 may essentially eliminate air recirculation losses, heat transfer, and the like associated with prior art outboard inter-disk cavities that accommodate vane inboard platforms (e.g., like platforms 42). Manufacturing complexity may further be reduced with the absence, for example, of the vane inboard platforms.

The foregoing principles may be applied in the reengineering of an existing engine configuration or in an original engineering process. Various engineering techniques may be utilized. These may include simulations and actual hardware testing. The simulations/testing may be performed at static conditions and one or more non-zero speed conditions. The non-zero speed conditions may include one or both of steady-state operation and transient conditions (e.g., accelerations, decelerations, and combinations thereof). The simulation/tests may be performed iteratively. The iteration may involve varying parameters of the spacers 62C-62H such as spacer thickness, spacer curvature or other shape parameters, vane tip curvature or other shape parameters, and static tip-to-spacer separation (which may include varying specific positions for the tip and the spacer). The iteration may involve varying parameters of the couplings 66C-66H such as the thickness profiles of the structures 70 and 72, the size and geometry of the teeth 74, the radial position of the couplings, and the like.

One or more embodiments of the present invention have been described. Nevertheless, it will be understood that various modifications may be made without departing from the spirit and scope of the invention. For example, when applied as a reengineering of an existing engine configuration, details of the existing configuration may influence details of any particular implementation. Accordingly, other embodiments are within the scope of the following claims.

What is claimed is:

1. A turbine engine comprising:
    a first disk and a second disk, each extending radially from an inner aperture to an outer periphery; and
    a coupling, transmitting a torque and a longitudinal compressive force between the first and second disks and comprising:
        first means for transmitting a majority of the torque; and
        second means, radially outboard of the first means, for transmitting a majority of the force.

2. The engine of claim 1 wherein:
    the first means comprise interfitting first and second pluralities of teeth on the first and second disks, respectively.

3. The engine of claim 2 wherein:
    the first plurality of teeth is at an aft rim of a first sleeve extending aft from and unitarily-formed with a web of the first disk;
    the second plurality of teeth is at a forward rim of a second sleeve extending forward from and unitarily-formed with a web of the second disk; and
    the first and second disks each have an inboard annular protuberance inboard of the respective first and second sleeves.

4. The engine of claim 2 wherein:
    the second means comprises a spacer having an outwardly longitudinally concave portion having a thickness and a longitudinal extent effective to provide an increase in said force with a rotation speed of the first and second disks.

5. The engine of claim 1 wherein:
    the engine has a high speed and pressure compressor section; and
    the first and second disks are in the high speed and pressure compressor section.

6. The engine of claim 5 further comprising:
    a plurality of circumferentially-spaced anti-vortex tubes carried by the first means.

7. The engine of claim 1 further comprising:
    a tension shaft extending within the inner aperture of each of the first and second disks.

8. The engine of claim 1 further comprising:
    a tension shaft extending within the inner aperture of each of the first and second disks and substantially nonrotating relative to the first and second disks; and
    means for sealing between the first disk and the shaft.

9. The engine of claim 1 further comprising:
    a third disk, extending radially from an inner aperture to an outer periphery; and
    a second coupling, transmitting a torque and a longitudinal compressive force between the third and second disks and comprising:
        first means for transmitting a majority of the torque; and
        second means, radially outboard of the first means, for transmitting a majority of the force.

10. The engine of claim 1 wherein:
    there are no off-center tie members holding the first and second disks under longitudinal compression.

11. A thermally-controlled, center-tied, rotor comprising:
    a central shaft;
    a plurality of blade disks, the disks each having a central aperture surrounding the shaft, and the disks defining annular cavities between adjacent pairs of the disks;
    one or more circumferentially-distributed anti-vortex tubes extending within at least a first of said cavities between first and second of said disks; and
    a radially compliant seal between the shaft and at least one of said disks.

12. The rotor of claim 11 further comprising:
    a radial spline torque coupling between the first and second disks and carrying the one or more circumferentially distributed anti-vortex tubes.

13. The rotor of claim 11 wherein:
    the radially compliant seal is a bellows seal positioned to thermally isolate at least a portion of one or more of the cavities from one or more others of the cavities.

14. The rotor of claim 11 wherein:
    the one or more circumferentially-distributed anti-vortex tubes are a plurality of evenly circumferentially-spaced tubes at a common longitudinal position.

15. A turbine engine rotor comprising:
a plurality of disks, each disk extending radially from an inner aperture to an outer periphery;
a plurality of stages of blades, each stage borne by an associated one of said disks;
a plurality of spacers, each spacer between an adjacent pair of said disks; and
a central shaft carrying the plurality of disks and the plurality of spacers to rotate about an axis with the plurality of disks and the plurality of spacers, wherein:
a first of the spacers transmits a majority of a longitudinal compressive force between a first and a second of the disks; and
interfitting first and second portions of said first and second disks radially inboard of said first spacer transmit a majority of a longitudinal torque between the first and second disks.

16. The rotor of claim 15 wherein:
the interfitting first and second portions comprise radial splines.

17. The rotor of claim 15 wherein:
the first spacer is unitarily-formed with the first disk; and
the first spacer has an end portion essentially interference fit within a portion of the second disk.

18. The rotor of claim 15 in combination with a stator and wherein:
the stator comprises a plurality of stages of vanes;
the first spacer has a longitudinal cross-section, said longitudinal cross-section having a first portion being essentially outwardly concave in a static condition; and
said stages of vanes include at least a first stage of vanes having inboard vane tips in facing proximity to an outer surface of said first spacer at said first portion.

19. The combination of claim 18 wherein:
the inboard tips of the first stage of vanes are longitudinally convex.

20. A system for coupling first and second turbomachine disks comprising:
first interfitting portions of the first and second disks; transmitting a majority of a longitudinal torque between the first and second disks; and
a spacer, spaced radially outboard of the first interfitting portions, the spacer having a longitudinally outwardly concave portion and transmitting a majority of a longitudinal compressive force between the first and second disks.

21. The system of claim 20 wherein:
the first interfitting portions of the first and second disks comprise interfitting first and second pluralities of teeth on the first and second disks, respectively.

22. The system of claim 20 wherein:
the spacer is separate from at least one of the first and second disks.

23. The system of claim 20 wherein:
the first and second disks each extend radially from an inner aperture to an outer periphery, the outer periphery carrying an associated stage of blades either unitarily-formed therewith or attached thereto;
the spacer is proximate the outer peripheries; and
a tension shaft extends through the inner apertures.

* * * * *